Nov. 17, 1959 N. J. REGNIER ET AL 2,913,583

SOLAR TRACKING SYSTEM OR THE LIKE

Filed April 20, 1956

INVENTORS
NORMAN J. REGNIER
MARLIN R. SHAFFER
BY
THEIR ATTORNEY

United States Patent Office 2,913,583

Patented Nov. 17, 1959

2,913,583

SOLAR TRACKING SYSTEM OR THE LIKE

Norman J. Regnier, Los Angeles, and Marlin R. Shaffer, North Hollywood, Calif., assignors to Hoffman Electronics Corporation, a corporation of California Application April 20, 1956, Serial No. 579,686

8 Claims. (Cl. 250—203)

This invention is related to apparatus for tracking the sun in its trajectory relative to the earth for the purpose of obtaining normal impingement of the sun's rays on an object or objects to be activated thereby, such as photo-voltaic semiconductor devices conventionally known as solar cells. More particularly, the present invention is directed toward the providing of sun tracking apparatus with the tracking itself being accomplished by circuit means and one or a plurality of control device solar cells associated therewith.

Of recent date there has been developed photo-voltaic, semiconductor devices which upon impingement of light rays or photons thereupon in the region of a PN junction or junctions associated therewith operate so as to produce a plurality of hole-electron pairs, thus producing electrical current through a connected load. The electrical and electronic industries will contemplate the use of such photo-voltaic devices, hereinafter referred to as solar cells, to form banks of small, electric current generators. These solar cells may be connected in series, in parallel, or in series-parallel, depending upon the use to which the solar cell bank is to be put. It would of course be desirable if a bank of solar cells might, as a unit, be progressively oriented so as to receive substantially normal impingement of the sun's rays thereupon during substantially all of the daylight hours.

Therefore, it is an object of the present invention to provide a new and useful solar tracking system incorporating as sensing or control elements one or a plurality of solar cells.

It is a further object of the present invention to provide solar tracking system apparatus which by self-contained means is capable of progressive orientation so that the solar cell bank associated therewith will obtain substantially normal impingement of the sun's rays thereupon for all dispositions of the sun relative to the observer.

According to the present invention a bank of solar cells may, though not necessarily, be oriented in substantially planar disposition with respect to each other on a solar cell mounting member. Motor means are provided to orient the solar cell bank in accordance with all possible positions of the sun relative to the apparatus. At least one or a plurality of solar cells serve as control or sensing devices and are coupled through novel circuit means to the aforementioned motor means.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figures 1, 2:
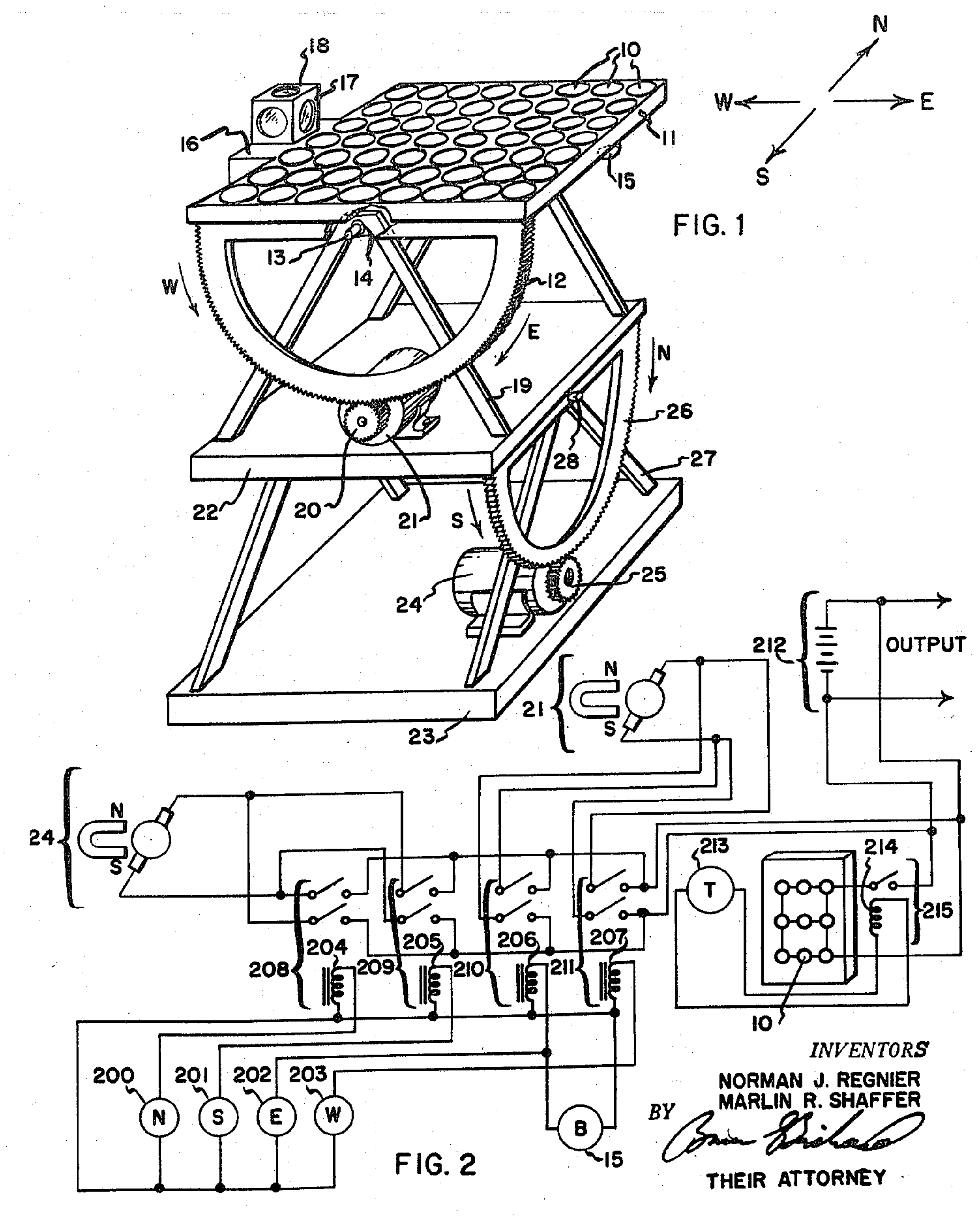
Figure 1 is a perspective view of solar tracking apparatus according to the present invention, showing with particularity the major mechanical components of the apparatus.
Figure 2 is a schematic diagram of a typical circuit which may be associated with the apparatus of Figure 1.

In Figure 1, a plurality of solar cells 10 are shown mounted upon base member 11. The several solar cells 10 may be connected either in series, in parallel, or in series-parallel, as is dictated by the use to which the solar cells are to be put. Fixedly disposed to the underneath side of base member 11 are D-shaped rack gear 12, and mountings 13 for rotatable shaft 14. Also mounted on the underneath side of base member 11 is solar cell 15, the existence for which shall be hereinafter explained. Base member 11 may be provided with portion 16 which accommodates the mounting thereon of control unit 17. Control unit 17 is provided with solar cells 18 on the top and four sides thereof. Preferably, the solar cells mounted in the sides of control unit 17 are disposed slightly interior to the outer surface thereof. The reason for this feature is to aid the directivity of the side disposed solar cells associated with control unit 17. Inverted V-shaped members 19 are appropriately bearinged in the region of shaft 14 so as to permit the rotational displacement thereof in accordance with the interaction of rack gear 12 with pinion 20, associated with motor 21. Motor 21 is, as shown, mounted upon base member 22.

In a similar manner, base member 23 is provided with motor 24 having pinion gear 25 adapted for cooperative relationship with D-shaped rack gear 26 affixed to base member 22. Again, base member 23 is provided with inverted V-shaped members 27 which are appropriately bearinged so as to cooperate with shaft 28, appropriately affixed to base member 22. It will of course be understood that rather than employ the shafts 14 and 28, one might reasonably employ any other suitable type of mount permitting rotational displacement of one member with respect to another, such as a roller bearing mount, a ball bearing mount, or other means.

The apparatus shown in Figure 1 operates as follows. The counterclockwise rotation of pinion gear 20 associated with motor 21 will, by virtue of cooperation thereof with D-shaped rack gear 12, produce a tilting of base member 11 and the bank of solar cells associated therewith in an easterly direction, as shown. Correspondingly, the clockwise rotation of pinion gear 20 will produce a tilting of base member 11 and the solar cells associated therewith in a general westerly direction. Assuming the inoperation of motor 21 for the moment, a clockwise rotation of pinion gear 25 associated with motor 24 will produce a tilting of base member 11 in a southerly direction, whereas the counterclockwise rotation of pinion gear 25 will produce a tilting of base member 11 in a northerly direction. Thus, the apparatus shown, upon appropriate energization of motors 21 and 24, will provide for normal impingement of the sun's rays upon solar cells 10 for all dispositions of the sun relative to the apparatus, and this including compensation for the obliquity of the ecliptic as is manifest throughout the seasons of the year.

Thus, motor 21 may be termed the east-west motor, and motor 24 the north-south motor. In a manner as shall be hereinafter described the solar cells associated with control unit 18 on the east and west sides thereof operate to control motor 21. The solar cells on the north and south sides of control unit 17 operate to control the operation of motor 24. The manner in which this motor operation is accomplished is illustrated in Figure 2.

In Figure 2 it is shown that motors 21 and 24 may be of the D.C. type having permanent magnet fields. North, south, east, and west solar cells 200 through 203 are coupled together at one end and to one end of each of relay windings 204 through 207. The remaining ends of the aforementioned solar cells are coupled, respectively, to the remaining ends of relay windings 204 through 207, as shown. Bottom solar cell 15, shown on the bottom of base member 11 in Figure 1, may be coupled across relay winding 206 as shown. Each of the several relays 208 through 211 may comprise the double-pole single-throw type with the several contacts intercoupling the motors 21 and 24 to their respective power source, battery 212, in one of two polarities; thus, energization of relays 208 and 210 will couple motors 24 and 21 to battery 212 in one polarity, whereas energization of relays 209 and 211 will couple motors 24 and 21 to battery 212 in the opposite polarity. The bank of solar cells 10 are shown connected across battery 212 in charging relationship. Light impinging upon solar cell 200 will cause relay 208 to close, thereby causing motor 24 to run in one direction, i.e. producing counterclockwise rotation of pinion gear 25 in Figure 1. Correspondingly, light impinging upon solar cell 201 in Figure 2 will cause the north-south motor 24 to rotate in the opposite direction. Thus, pinion gear 25 will be caused to rotate in a clockwise direction, thus tilting solar cells 10 to the south. A substantially identical operation is achieved upon energization of the east and west solar cells associated with east-west motor 21.

It is to be noted that the top solar cell 213 associated with control unit 17 in Figure 1 is coupled across relay winding 214 of relay 215. It is seen that the contacts of relay 215 are connected in series between solar cells 10 of the solar cell bank and battery 212. Thus, the purpose of solar cell 213 is to insert across battery 212 the solar cells 10 only during the daylight hours so as to preclude discharge through the solar cell bank of the battery 212 during the nighttime.

There remains to be discussed the operation of solar cell 15, shown at the bottom of base member 11 in Figure 1 and also shown coupled across relay winding 206 in Figure 2. Since the sun sets in the west, the solar cell bank disposed upon base member 11 in Figure 1 will be tilted toward the west at nighttime and during the early morning hours. Thus, solar cell 15 at the bottom and on the right hand side of base member 11 will be exposed to the sun's rays coming from the east. Upon energization of solar cell 15 the east-west motor commences to run, tilting the base member 11 in an easterly direction. Hence, control unit 17 will emerge from its disposition within the shadow of base member 11 during early morning hours to take over control of the apparatus, i.e. by means of the east solar cell 202.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. In combination, a support member, a plurality of electrically intercoupled solar cells mounted upon said support member, a first means including a first motor mechanically coupled to said support member for tilting said support member in either of two opposite directions, a second means including a second motor mechanically coupled to said support member for tilting said support member in either of two opposite directions related in quadrature with respect to the aforementioned opposite directions, each of said motors having first and second input terminals, a battery having first and second terminals, first, second, third and fourth relays each having a relay winding and first and second normally open sets of first and second relay contacts, said second contacts of said first set of contacts of each of said relays being coupled together and to said first terminal of said battery, said second contacts of said second set of contacts of each of said relays being coupled together and to said second battery terminal, said first terminal of said first motor being coupled to said first contact of said second set of contacts of said fourth relay and also to said first contact of said first set of contacts of said third relay, said second terminal of said first motor being coupled to said first contact of said first set of contacts of said fourth relay and also to said first contact of said second set of contacts of said third relay, said first terminal of said second motor being coupled to said first contact of said second set of contacts of said second relay and also to said first contact of said first set of contacts of said first relay, said second terminal of said second motor being coupled to said first contact of said first set of contacts of said second relay and also to said first contact of said second set of contacts of said first relay, and additional first, second, third, and fourth solar cells coupled across said relay windings of said first, second, third and fourth relays respectively, said additional solar cells being disposed in space phase quadrature; and a fifth solar cell coupled across said fourth relay winding and disposed substantially underneath said support member.

2. In combination, a support member, a plurality of electrically intercoupled solar cells mounted upon said support member, a first means including a first motor mechanically coupled to said support member for tilting said support member in either of two opposite directions, a second means including a second motor mechanically coupled to said support member for tilting said support member in either of two opposite directions related in quadrature with respect to the aforementioned opposite directions, each of said motors having first and second input terminals, a battery having first and second terminals, first, second, third and fourth relays each having a relay winding and first and second normally open sets of first and second relay contacts, said second contacts of said first set of contacts of each of said relays being coupled together and to said first terminal of said battery, said second contacts of said second set of contacts of each of said relays being coupled together and to said second battery terminal, said first terminal of said first motor being coupled to said first contact of said second set of contacts of said fourth relay and also to said first contact of said first set of contacts of said third relay, said second terminal of said first motor being coupled to said first contact of said first set of contacts of said fourth relay and also to said first contact of said second set of contacts of said third relay, said first terminal of said second motor being coupled to said first contact of said second set of contacts of said second relay and also to said first contact of said first set of contacts of said first relay, said second terminal of said second motor being coupled to said first contact of said first set of contacts of said second relay and also to said first contact of said second set of contacts of said first relay, and additional first, second, third, and fourth solar cells coupled across said relay windings of said first, second, third and fourth relays respectively, said additional solar cells being disposed in space phase quadrature, said first and second terminals of said battery also being coupled electrically to said plurality of intercoupled solar cells; and a fifth solar cell coupled across said fourth relay winding and disposed substantially underneath said support member.

3. In combination, the apparatus of claim 2, a fifth solar cell coupled across said fourth relay winding and disposed substantially underneath said support member, a fifth relay having at least one set of relay contacts interposed between said plurality of intercoupled solar cells and said battery and a relay winding, and a sixth solar cell coupled across said fifth relay winding and disposed substantially parallel to said support member, thus to face in a substantially upward direction.

4. In combination, apparatus according to claim 3, a sensing block support member adapted to accommodate the fixed disposition of said first, second, third, fourth and sixth solar cells, with respect thereto.

5. In combination, a base member, a support for objects thereon, each having a surface to be oriented toward a light source whose position changes with respect to the base member, means movably mounting the support on the base member for adjustment about two horizontal orthogonally related axes to orient the objects with the surfaces with said surfaces towards the light source to receive light rays therefrom normal to said surfaces, at least two sensing devices rendered operative by direct radiations from the light source movable together with said support and each facing in a direction parallel to one of the axes respectively, and means responsive to each of said sensing devices when rendered operative by direct radiations from the light source for moving said support about a respective one of said axes until said sensing devices are out of the path of direct radiation to thereby orient the objects towards the light source.

6. In combination, a base member, a support for objects thereon, each having a surface to be oriented toward a light source whose position changes with respect to the base member, means movably mounting the support on the base member for movement about two horizontal orthogonally related axes to orient the objects with the surfaces toward the light source, reversible motive means for moving the support in either direction about each axis, light sensitive devices facing in both directions along lines parallel to both axes and movable together with said support, said light sensitive devices being rendered operative by direct radiations from the light source, and separate means controlled by each of said light sensitive devices when rendered operative by direct radiations from the light source for controlling the motive means to move the support to orient the objects thereon toward the light source with said surfaces normal to the light rays therefrom.

7. The combination of claim 6 in which a further light sensitive device faces in a direction normal to the two axes and oppositely to that faced by the objects on the support.

8. In combination a base member, a support for a plurality of solar batteries having surfaces to be exposed to the sun, means mounting said support on the base for movement about two orthogonally related horizontal axes for orienting the batteries with the surfaces directly toward the sun, a second plurality of solar batteries movable with the support and facing in both directions parallel to the axes, motive means for moving said support in opposite directions about each axis, and means individual to batteries of the second plurality facing in each said direction respectively, for energization thereby to control said motive means to orient the support to cause the solar batteries of the first plurality to directly face the sun with the surfaces normal to the light rays therefrom.

References Cited in the file of this patent

UNITED STATES PATENTS

| | | |
|---|---|---|
| 2,155,402 | Clark | Apr. 25, 1939 |
| 2,403,387 | McLennan | July 2, 1946 |
| 2,513,367 | Scott | July 4, 1950 |